United States Patent
Reuter

(10) Patent No.: US 9,783,938 B2
(45) Date of Patent: Oct. 10, 2017

(54) SELF-PROPELLED CONSTRUCTION MACHINE

(71) Applicant: BOMAG GmbH, Boppard (DE)

(72) Inventor: Marco Reuter, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/652,943

(22) PCT Filed: Dec. 17, 2013

(86) PCT No.: PCT/EP2013/003821
§ 371 (c)(1),
(2) Date: Jun. 17, 2015

(87) PCT Pub. No.: WO2014/095048
PCT Pub. Date: Jun. 26, 2014

(65) Prior Publication Data
US 2015/0337506 A1    Nov. 26, 2015

(30) Foreign Application Priority Data

Dec. 18, 2012   (DE) .......................... 10 2012 024 770

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *E21C 31/02* (2013.01); *F16H 57/0436* (2013.01)

(58) Field of Classification Search
CPC ...... E01C 23/088; E01C 23/127; E21C 31/02; B60K 25/00; B60K 2025/026
See application file for complete search history.

(56) References Cited

U.S. PATENT DOCUMENTS

| 3,435,928 A * | 4/1969 | Horning | .................. | E21C 27/22 |
|---|---|---|---|---|
| | | | | 299/1.4 |
| 7,644,994 B2 * | 1/2010 | Busley | .................. | E01C 23/127 |
| | | | | 299/39.4 |

(Continued)

FOREIGN PATENT DOCUMENTS

| DE | 100 31 195 C1 | 1/2002 |
|---|---|---|
| WO | 2005/005119 A1 | 1/2005 |

OTHER PUBLICATIONS

The International Bureau of WIPO, International Preliminary Report On Patentability, International Application No. PCT/EP2013/003821, dated Jun. 23, 2015 (6 pages).

*Primary Examiner* — John Kreck
*Assistant Examiner* — Michael Goodwin
(74) *Attorney, Agent, or Firm* — Wood Herron & Evans LLP

(57) ABSTRACT

A self-propelled construction machine, in particular a road milling machine, is described. It has a main drive for driving a rotating working means in a working operation and an auxiliary drive for driving the working means in a maintenance operation and a gear transmission on the working means. Lubricant oil is applied to the gear transmission via a lubricant oil circuit and a lubricant oil pump in the lubricant oil circuit, the lubricant oil pump being in drive connection to the gear transmission. An auxiliary pump is provided, which is optionally switchable into the lubricant oil circuit, so that, with reversal of the pump principle, the lubricant oil pump is operated as a hydraulic motor, wherein the drive connection of the lubricant oil pump and the gear transmission is also reversed to drive the gear transmission.

5 Claims, 3 Drawing Sheets

(51) Int. Cl.
*E21C 31/02* (2006.01)
*F16H 57/04* (2010.01)

(56) References Cited

U.S. PATENT DOCUMENTS

| | | | | |
|---|---|---|---|---|
| 7,976,106 B2* | 7/2011 | Berning | ............... | E01C 21/00 |
| | | | | 299/39.4 |
| 8,608,250 B2* | 12/2013 | O'Neill | ............... | E21C 31/02 |
| | | | | 299/12 |
| 2005/0206216 A1* | 9/2005 | O'Neill | ............... | E21D 9/1013 |
| | | | | 299/95 |
| 2007/0132304 A1 | 6/2007 | Holl et al. | | |
| 2009/0278359 A1* | 11/2009 | Trede | ............... | F01D 25/36 |
| | | | | 290/55 |
| 2013/0143714 A1* | 6/2013 | Wachsmann | ............... | B60W 10/02 |
| | | | | 477/6 |
| 2014/0333116 A1 | 11/2014 | Busley et al. | | |

* cited by examiner

SELF-PROPELLED CONSTRUCTION MACHINE

CROSS-REFERENCE TO RELATED APPLICATIONS

This application is a submission under 35 U.S.C. §371 of International Application No. PCT/EP2013/003821, filed Dec. 17, 2013, which claims priority to German Application No. 10 2012 024 770.2, filed Dec. 18, 2012, the disclosures of which are hereby expressly incorporated by reference herein in their entireties.

FIELD OF THE INVENTION

A self-propelled construction machine, in particular a road milling machine, having a main drive for driving a rotating working means in a working operation, and having an auxiliary drive for driving the working means in a maintenance operation, having a gear transmission on the working means, and having a lubricant oil circuit and a lubricant oil pump in the lubricant oil circuit for supplying the gear transmission, the lubricant oil pump being in drive connection to the gear transmission.

BACKGROUND OF THE INVENTION

Construction machines of this type are known, for example, in the form of road milling machines, recyclers, stabilizers, and surface miners. The working means is a milling drum equipped with chisels in these examples. During the maintenance of the milling drum, in particular during the replacement of chisels, the milling drum must be rotated slowly and in small angle steps so that an operator obtains successive access to the entire cylinder surface. Since the main drive is operated at a high rotational speed, an auxiliary drive is required for the maintenance operation, which drives the milling drum at a low rotational speed, and which enables a drum rotation in small steps. Precautions must be taken which ensure a disconnection of the auxiliary drive from the main drive to protect the auxiliary drive, since the auxiliary drive is typically only suitable for comparatively low rotational speeds. If the auxiliary drive is also moved by the main drive at higher rotational speed, damage or destruction of the auxiliary drive occurs. A freewheel or a similar measure is required to avoid this.

A road milling machine having a main drive and an auxiliary drive for maintenance work is described in DE 10031195 C1. The milling drum is coupled via a belt drive to the main drive, which is implemented as a diesel engine. An electric motor having sufficient power to rotate the milling drum into desired maintenance positions is used as the auxiliary drive. The auxiliary drive is arranged in the region of the belt drive, which is unfavorable for reasons of space and with regard to cleaning.

In road milling machines of this type, a mechanical gear transmission is arranged on the milling drum or at least partially integrated in the milling drum. Lubricant oil, which is circulated by a lubricant oil pump in a lubricant oil circuit, is supplied for the lubrication of the gear transmission. The lubricant oil pump is in drive connection to the gear transmission, that is to say, the drive wheel of the lubricant oil pump is mechanically connected to a transmission wheel or a transmission shaft, so that a torque can be transmitted. Plug-on pumps to be plugged on transmission shafts or for integration into the transmission are known for this purpose, for example. Furthermore, it is known to implement transmission elements so as to act as a lubricant oil pump.

The present invention is based on the object of specifying a construction machine of the type described above, which has a compact construction with respect to the auxiliary drive.

SUMMARY OF THE INVENTION

This object is achieved in that an auxiliary pump is provided, which is optionally switchable into the lubricant oil circuit, so that, with reversal of the pump principle, the lubricant oil pump is operated as a hydraulic motor, wherein the drive connection of the lubricant oil pump and the gear transmission is also reversed to drive the gear transmission.

A basic concept of the present invention is thus to provide a hydrostatic transmission for the maintenance operation, in which the lubricant oil pump has the function, by reversal, as a hydraulic motor, which is driven by a spatially separated auxiliary pump. This has the advantage that no additional component, for example, the auxiliary motor, has to be arranged in the region of the milling drum and the belt drive, so that no installation space must be kept free for this purpose in this region. A compact construction is therefore possible, since no further components are required in the drive train of the construction machine. The auxiliary pump can be arranged at a location which is favorable with respect to the installation space and may be relatively far from the milling drum and the belt drive of the milling drum, since a greater distance between the pump and the motor can be provided in the case of a hydrostatic transmission.

Fundamentally, the lubricant oil could be guided via an oil cooler and an oil filter, which are typically provided for cooling and filtering the transmission oil in working operation, in maintenance operation as in working operation. However, since friction losses result from this and cooling and filtering can be omitted in maintenance operation, it is particularly advantageous that the lubricant oil circuit has a main strand and a parallel secondary strand, that the oil cooler and the oil filter are provided in the main strand, and that the auxiliary pump is arranged in the secondary strand.

It is particularly user-friendly that a switchover valve is provided for switching over between the main strand and the secondary strand. If the switchover valve is electrically operable, it can be integrated in a simple manner in the controller of the construction machine.

An advantageous refinement of the present invention is that in maintenance operation the auxiliary pump is located in a closed circuit between the lubricant oil pump and an oil container of the gear transmission. This has the advantage that no additional oil container is required, which occupies installation space.

However, it can also be advantageous that the auxiliary pump is connected in maintenance operation on the suction side to a lubricant oil reservoir outside the transmission housing. In this manner, the lubricant oil quantity in the secondary strand is increased, so that sufficient lubricant oil for driving the lubricant oil pump is available also in the case of long line paths in the secondary strand.

The auxiliary pump is expediently driven by the main drive of the construction machine, which has the advantage that the auxiliary pump can be connected, for example, to existing pump distributors.

BRIEF DESCRIPTION OF THE DRAWINGS

The present invention will be described in greater detail below with reference to two exemplary embodiments illustrated in the drawings. In the schematic figures.

DETAILED DESCRIPTION OF THE INVENTION

Figure 1:
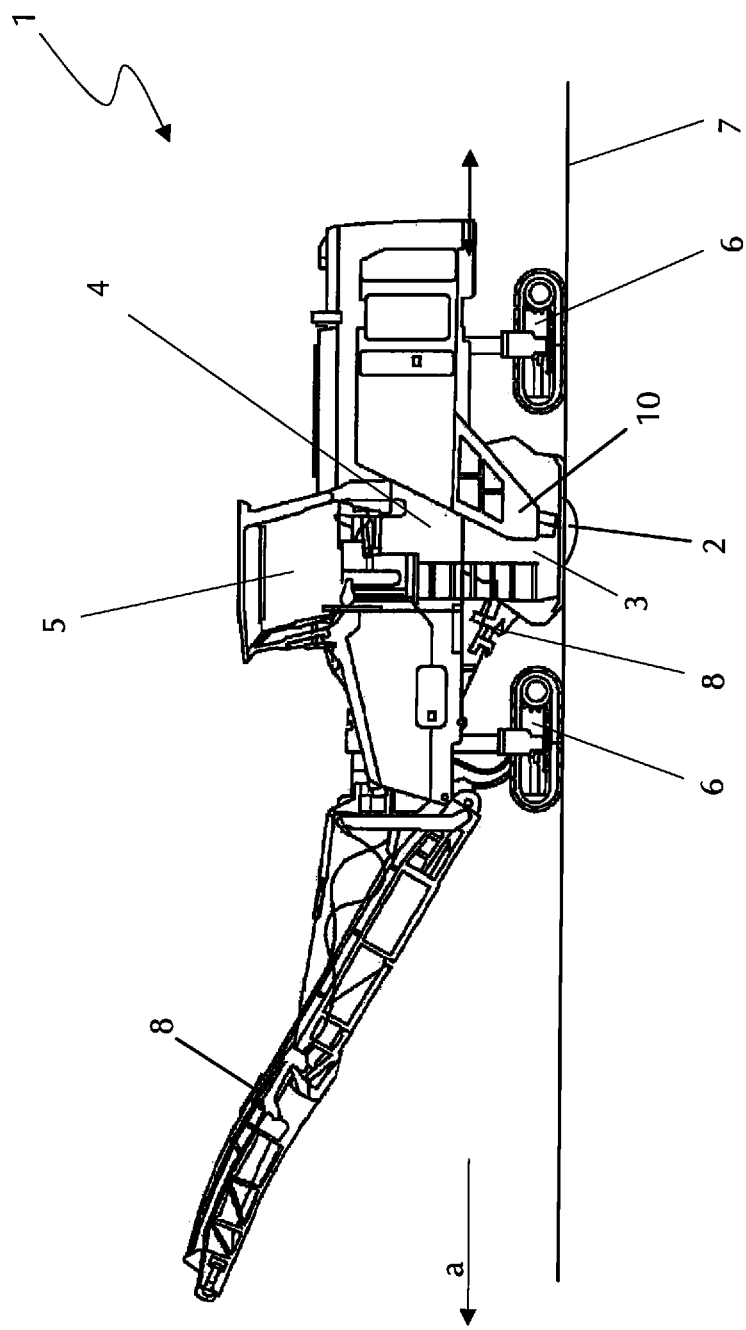
FIG. 1 shows a self-propelled construction machine implemented as a road milling machine.

FIG. 1 shows a road milling machine 1 of the front loader type having a milling drum 2 arranged in the middle, which is located in a milling box 3. Therefore, only a lower segment of the milling drum 2 is visible in this illustration. The lateral surface of the milling drum 2 is equipped in a way known per se with milling chisels (not shown). The working direction (forward direction) is indicated by an arrow a. The road milling machine 1 furthermore has a machine frame 4 having an operator platform 5 and crawler tracks 6 which are mounted so they are vertically adjustable via lifting columns on the machine frame 4 (wherein alternatively wheel units can also be used here).

The road milling machine 1 is provided with a main drive 9 (FIG. 2) implemented as a diesel engine. The main drive 9 is connected via a belt drive to the milling drum 2, which is concealed in the illustrated example by a belt drive cover 10.

In working operation, the milling drum 2 is driven by the belt drive, rotating at a high rotational speed of, for example, 1900 to 2100 RPM. The road milling machine 1 is moved at the same time over the ground 7 in the working direction a while milling material off of the ground 7. The milled material is spun by the rotation of the milling drum 2 out of the milling box 3 onto a multipart belt conveyor device 8, which is connected to the milling box 3, for removal.

For maintenance of the milling drum 2, for example, for replacement of milling chisels, the high-speed drive train, which leads, via the belt drive, from the main drive 9 to the milling drum 2, is interrupted. The drive of the milling drum 2 is performed in maintenance operation by means of an auxiliary drive having a very much lower rotational speed or only step-by-step, as described with reference to FIGS. 2 and 3.

Figure 2:
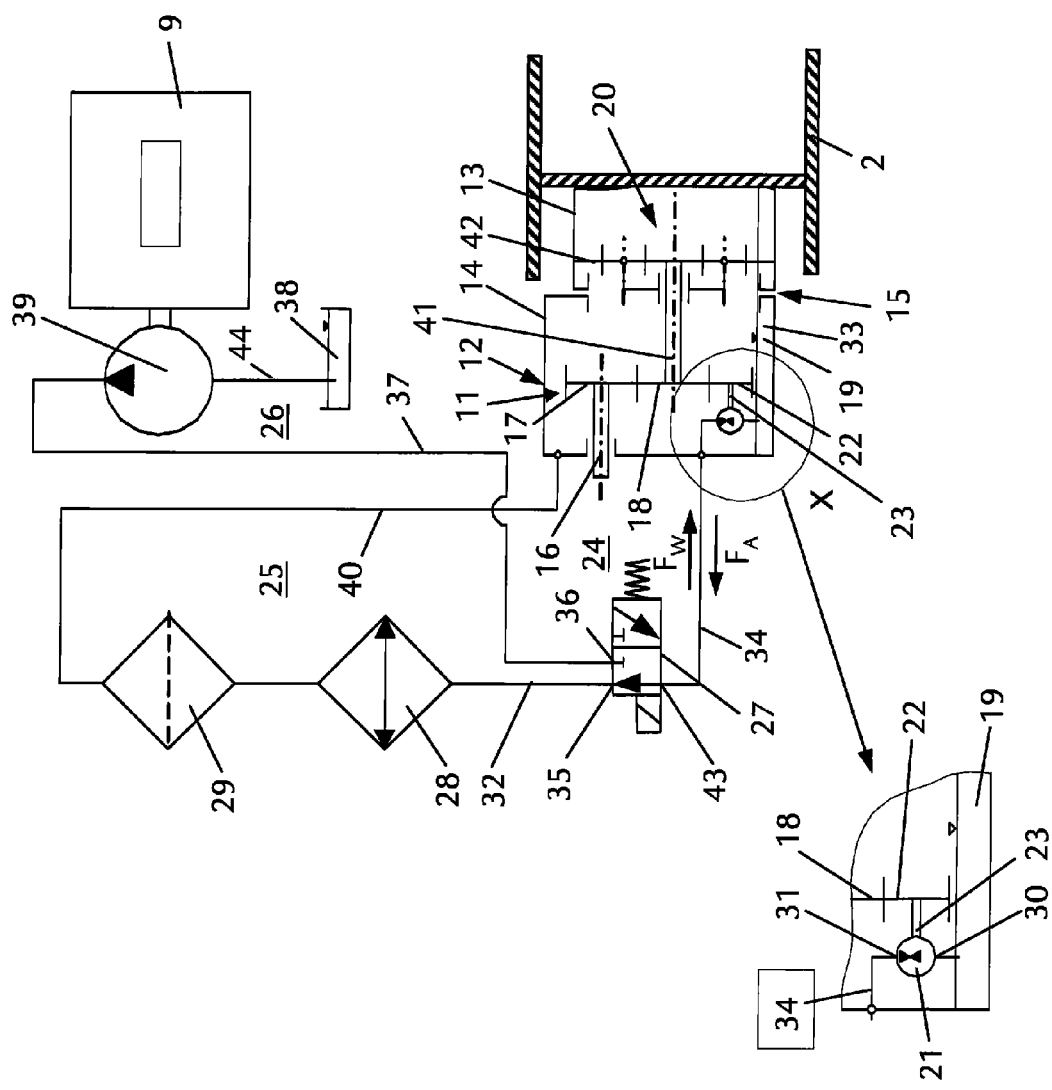
FIG. 2 shows a hydraulic circuit diagram of a first exemplary embodiment of an auxiliary drive.

According to FIG. 2, a mechanical gear transmission 11 is at least partially integrated in the milling drum 2. The gear transmission 11 is arranged in a transmission housing 12, which is composed of a rotating housing part 13, which is integrated in the milling drum 2, and a stationary housing part 14, which is arranged on the machine frame 4, both housing parts 13, 14 being joined to one another in a ring-shaped connection region 15, which is tightly closed relative to the outside. The rotating housing part 13 is flanged onto the milling drum 2.

The gear transmission 11 comprises, on the input side, an input shaft 16 having an input gearwheel 17, which meshes with a drive wheel 18 on the parallel drive shaft 41 of the milling drum 2. The input shaft 16 is connected via the belt drive (not shown) to the main drive 9. The drive shaft 41 is connected to a planetary gear 20, of which a planet wheel 42 is arranged on the inner jacket of the rotating housing part 13. The rotation of this housing part 13 is transmitted to the milling drum 2 because of the connection of the rotating housing part 13 to the milling drum 2.

Lubricant oil, which collects in the lower region of the transmission housing 12 as an oil sump 19, is located in the transmission housing 12. This region of the transmission housing 12 therefore serves as an oil container 33 for the lubricant oil.

Since the gear transmission 11 heats up due to the power loss arising therein, it must be cooled. For this purpose, the lubricant oil is circulated by means of a lubricant oil pump 21, which is implemented as a hydraulic pump and is integrated in the gear transmission 11. In the illustrated exemplary embodiment, the lubricant oil pump 21 is arranged in the stationary housing part 14 of the transmission housing 12, the pump shaft 23 being oriented in parallel to the drive shaft 41 of the milling drum 2. The lubricant oil pump 21 is driven via an intermediate wheel 22 of the gear transmission 11. The intermediate wheel 22 is seated on the pump shaft 23 of the lubricant oil pump 21 and meshes with the drive wheel 18 of the gear transmission 11. Therefore, not only is a drive train provided from the input shaft 16 via the input wheel 17, the drive wheel 18, the intermediate wheel 22, and the pump shaft 23 to the lubricant oil pump 21, but rather also a mechanical connection train is provided between the lubricant oil pump 21 and the milling drum 2. This connection train consists of the pump shaft 23, the intermediate wheel 22, the drive wheel 18, the drive shaft 41, the planetary gear 20, and the rotating housing part 13.

The circulation of the lubricant oil is performed via a lubricant oil circuit 24, which is located outside the gear transmission 11 and the transmission housing 12. The lubricant oil circuit 24 comprises a main strand 25 for the working operation and a secondary strand 26 for the maintenance operation, which are connected in parallel, and which can optionally be connected to the lubricant oil pump 21 alternatively via a switchover valve 27. The switchover valve 27 is implemented here as an electrically actuatable 3/2-way valve. The main strand 25 and the auxiliary strand 26 have a shared line section 34, which is connected on one side to a shared port 43 of the switchover valve 27 and on the other side to the lubricant oil pump 21, between the switchover valve 27 and the lubricant oil pump 21. A first change port 35 of the switchover valve 27 is connected to the feed line 32 of the main strand 25 and a second change port 36 is connected to the pressure line 37 of the secondary strand 26.

In working operation of the construction machine 1, the switchover valve 27 assumes a first switching state, which is shown in FIG. 2. The main strand 25 is connected in this case via the line section 34 to the lubricant oil pump 21 and the secondary strand 26 is turned off. The delivery direction in the line section 34 during the working operation is identified with the arrow $F_A$.

A cooler 28 and a filter 29 are typically arranged in the main strand 25 of the lubricant oil circuit 24, so that the circulating lubricant oil is cooled and filtered.

A first port 30 of the lubricant oil pump 21 serves as a suction port in the example of FIG. 2. The lubricant oil is sucked out of the oil sump 19 by the first port 30 and is pumped via a second port 31 of the lubricant oil pump 21, which serves as a pressure port here, and via the line section 34 into the feed line 32 of the main strand 25. After passing through the cooler 28 and the filter 29, the lubricant oil returns back into the transmission housing 12 above the oil sump 19 via the return line 40 of the main strand 25. The lubricant oil is incident therein in a known manner on specific transmission parts via spray nozzles or via boreholes in the housing. The transmission wheels are lubricated by immersion in the oil sump 19. The arrangement of the lubricant oil pump 21 is partially shown in an enlarged illustration X.

In maintenance operation, the lubricant oil pump 21 is operated as a hydraulic motor with reversal of the pump principle. For this purpose, the first port 30 of the lubricant oil pump 21 is used as an inlet for the lubricant oil and the second port 31 is used as the drain into the oil container 33.

The reversal is based on the fact that an auxiliary pump 39, which is driven by the main drive 9, is arranged in the secondary strand 26 of the lubricant oil circuit 24. The auxiliary pump 39 is arranged outside the transmission housing 12. Since the auxiliary pump 39 and lubricant oil pump 21 driven thereby are a hydrostatic transmission, the lines of the secondary strand 26 can be relatively long. The auxiliary pump 39 is therefore arranged at an installation location which lies outside the region of the belt drive. The pressure outlet of the auxiliary pump 39 is connected, after switching over the switchover valve 27, via the pressure line 37 to the second change port 36 of the switchover valve 27, i.e., the switchover valve is switched over with respect to the secondary strand 26 to passage, while the main strand 25 is turned off. The delivery direction of the secondary strand 26 is therefore, according to arrow $F_W$ in the line section 34, opposite to the delivery direction of the lubricant oil pump 21 in working operation. The suction intake of the auxiliary pump 39 is connected in the example of FIG. 2 via a suction line 44 to a lubricant oil reservoir 38 arranged outside the transmission housing 12.

In reverse operation, the lubricant oil pump 21 drives the intermediate wheel 22. A force flow to the milling drum 2 is provided via the above-described connection train formed by the pump shaft 23, the intermediate wheel 22, the drive wheel 18, the drive shaft 41, the planetary gear 20, and the rotating housing part 13, and the milling drum 2 is thus driven by the lubricant oil pump 21. Since the intermediate wheel 22 has a relatively small diameter in comparison to the drive wheel 18, this wheel pair represents a gear reduction in this drive direction. The rotation of the milling drum 2 therefore takes place at a correspondingly lower rotational speed, which is much lower than in working operation. Since the milling drum 2 is disengaged from the ground 7 in maintenance operation, only its own weight must be moved. The power of the lubricant oil pump 21 is sufficient for this purpose. The lubricant oil pump 21 thus serves in maintenance operation as an auxiliary drive for the milling drum 2.

Figure 3:
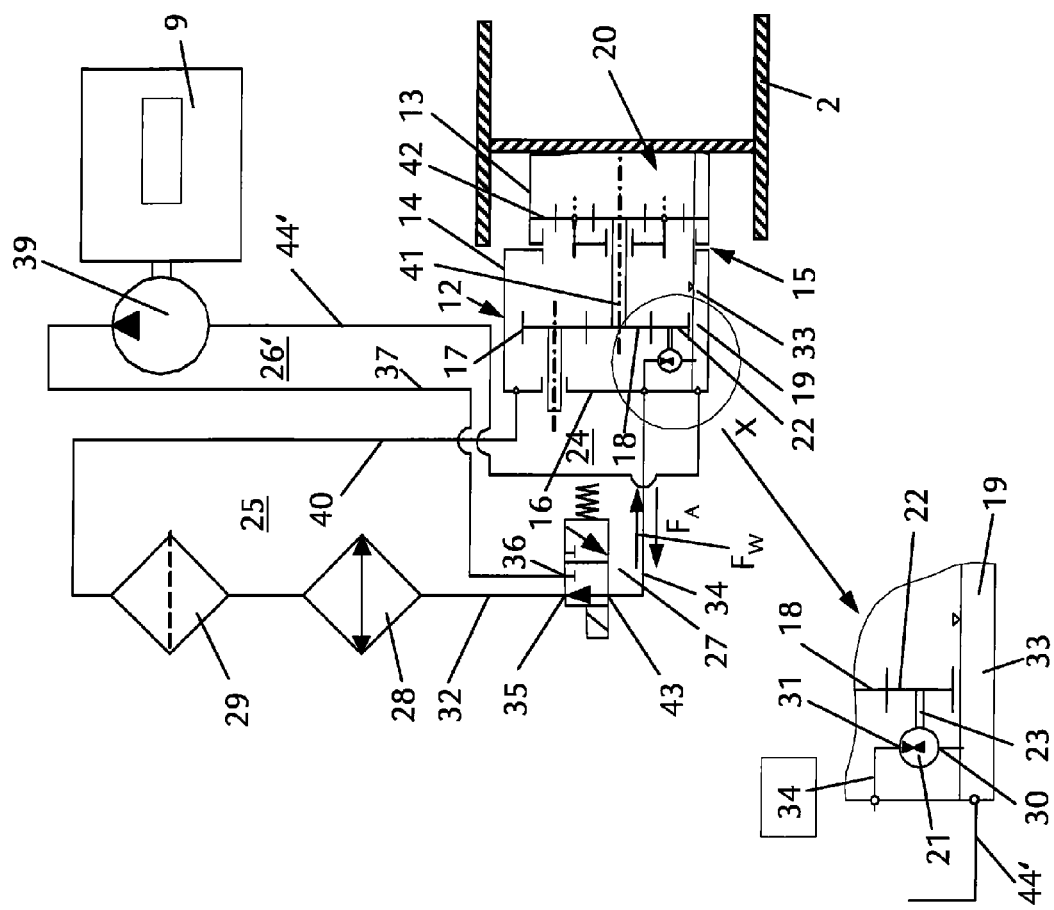
FIG. 3 shows a hydraulic circuit diagram of a second exemplary embodiment of an auxiliary drive.

In the exemplary embodiment according to FIG. 3, identical parts as in FIG. 2 are designated by identical reference numerals.

The second exemplary embodiment differs from the first exemplary embodiment with respect to the design of the secondary strand 26'. The suction intake of the auxiliary pump 39 is directly connected via the suction line 44' to the oil container 33 of the transmission housing 12 and the oil sump 19 here. In this case, the lubricant oil is conveyed in maintenance operation from the oil container 33 via the auxiliary pump 39 to drive the lubricant oil pump 21 in a closed circuit. The lubricant oil pump drives the milling drum 2 as in the first example.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A self-propelled construction machine,
 a main drive for driving a rotating working means in a working operation;
 an auxiliary drive for driving the working means in a maintenance operation;
 a gear transmission on the working means; and
 a lubricant oil circuit and a lubricant oil pump in the lubricant oil circuit for, in combination, supplying lubrication of the gear transmission, the lubricant oil pump being in drive connection with the gear transmission,
 wherein an auxiliary pump is provided which is optionally switchable into the lubricant oil circuit so that, by reversal, the lubricant oil pump is operated as a hydraulic motor, wherein the drive connection of the lubricant oil pump and the gear transmission is also reversed so that the lubricant oil pump drives the gear transmission,
 and further wherein the auxiliary pump is located in the maintenance operation in a closed circuit between the lubricant oil pump and an oil container of the gear transmission.

2. The construction machine according to claim 1, wherein the lubricant oil circuit has a main strand and a parallel secondary strand, an oil cooler and an oil filter being arranged in the main strand, and the auxiliary pump being arranged in the secondary strand.

3. The construction machine according to claim 2, wherein a switchover valve is provided for switching over between the main strand and the secondary strand.

4. The construction machine according to claim 1, wherein the auxiliary pump is driven by the main drive of the construction machine.

5. The construction machine according to claim 1, wherein the construction machine comprises a road milling machine.

* * * * *